(12) United States Patent
Walters

(10) Patent No.: US 9,141,385 B2
(45) Date of Patent: Sep. 22, 2015

(54) MANAGING OPERATING SYSTEM COMPONENTS

(71) Applicant: Red Hat, Inc., Raleigh, NC (US)

(72) Inventor: Colin G. Walters, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 404 days.

(21) Appl. No.: 13/648,205

(22) Filed: Oct. 9, 2012

(65) Prior Publication Data

US 2014/0101425 A1    Apr. 10, 2014

(51) Int. Cl.
  *G06F 9/44*   (2006.01)
  *G06F 9/00*   (2006.01)
  *G06F 11/00*  (2006.01)

(52) U.S. Cl.
  CPC *G06F 9/00* (2013.01); *G06F 9/441* (2013.01); *G06F 11/00* (2013.01)

(58) Field of Classification Search
  USPC ......... 713/300, 310, 320, 321, 322, 323, 324, 713/330, 340, 375
  See application file for complete search history.

(56) References Cited

U.S. PATENT DOCUMENTS

| | | | | |
|---|---|---|---|---|
| 6,178,503 | B1 * | 1/2001 | Madden et al. | 713/2 |
| 6,993,746 | B2 * | 1/2006 | Hue | 717/121 |
| 7,516,422 | B2 * | 4/2009 | Carlson et al. | 715/855 |
| 2003/0023839 | A1 * | 1/2003 | Burkhardt et al. | 713/1 |
| 2003/0121024 | A1 * | 6/2003 | Hill et al. | 717/107 |
| 2004/0003222 | A1 * | 1/2004 | Rich et al. | 713/1 |
| 2012/0191960 | A1 * | 7/2012 | Piwonka et al. | 713/2 |

OTHER PUBLICATIONS

GIT—local branching on the cheap; http://git-scm.com, version 1.8.1, Dec. 31, 2012.

* cited by examiner

*Primary Examiner* — Jaweed A Abbaszadeh
*Assistant Examiner* — Keshab Pandey
(74) *Attorney, Agent, or Firm* — Lowenstein Sandler LLP

(57) ABSTRACT

A plurality of operating system (OS) components is stored in a storage location on a computing device. A user may selected a set of OS components to use when the computing device boots. A boot location is created and links to the set of OS components are stored in the boot location. The computing device may boot using any one of a plurality of boot locations.

20 Claims, 6 Drawing Sheets

MANAGING OPERATING SYSTEM COMPONENTS

TECHNICAL FIELD

This disclosure relates to the field of operating systems and, in particular, to managing a plurality of operating system components on a computing device.

BACKGROUND

Users often employ various computing devices (e.g., computer systems, smart phones, laptop computers, tablet computers, netbook computers, desktop computers, server computers, personal digital assistants (PDAs), cell phones, smart phones, etc.) to perform various tasks. For example, a user may use a laptop computer and a web browser to access content online. In another example, a user may use a desktop computer and a word processing application to create a document. These computing devices generally use an operating system (OS). An OS may be one or more software applications, components, and/or modules that manage hardware resources for a computing device and provide common services for applications on the computing device. Generally, most computing devices require an OS to operate or function.

New versions of operating systems (OSes) may be released or current versions of OSes may be updated and/or modified to fix errors (e.g., bugs or regressions), to add functionality, to add new features, etc. For example, a library and/or a package in an OS may be updated to use a new communication protocol. In another example, the user interface of an OS may be updated to allow users to perform a task more efficiently. In a further example, a new library and/or package may provide new functionality for the computing device.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
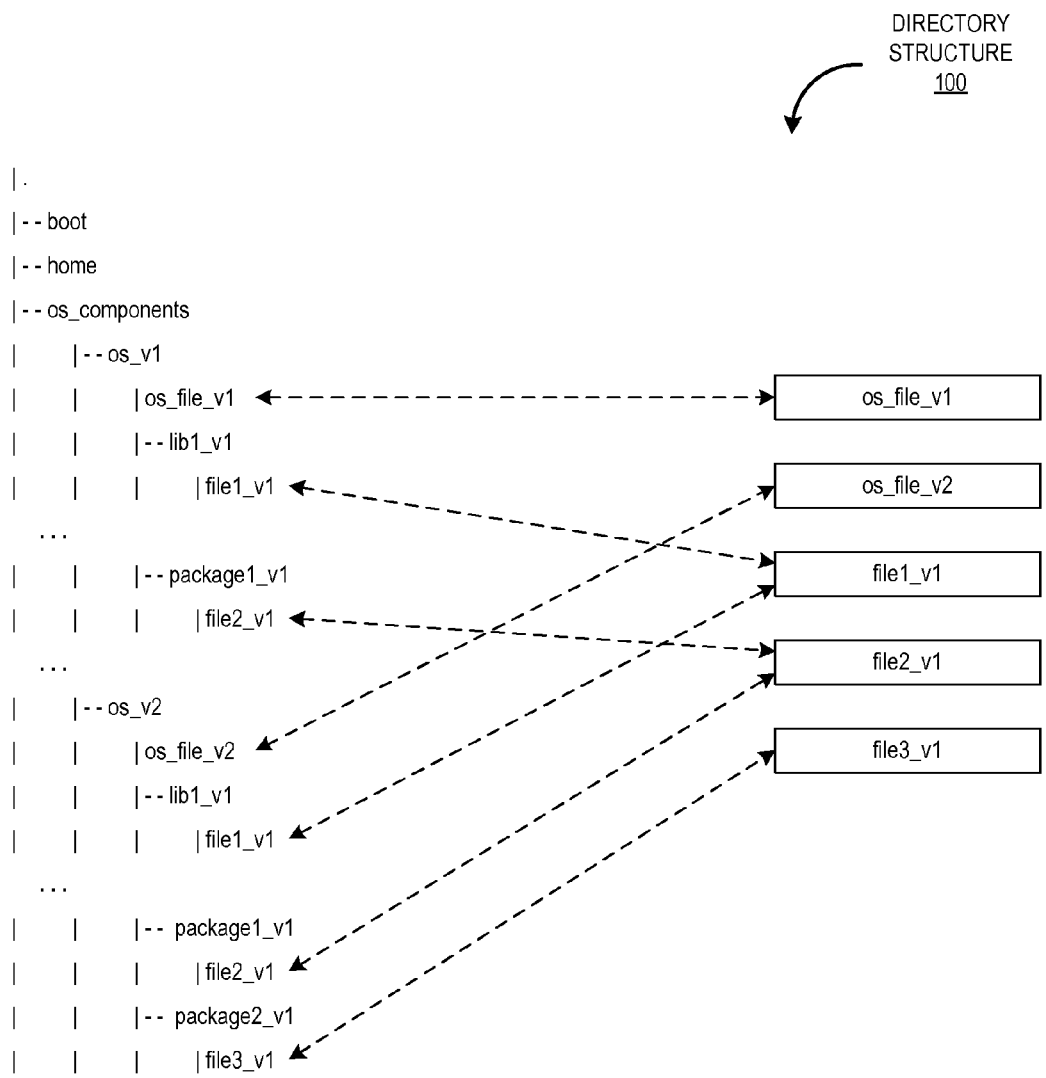
FIG. 1 is a block diagram illustrating an example directory structure, according to one embodiment.

Systems and methods in accordance with various embodiments of the present disclosure provide the ability to manage OS components for a computing device. In one embodiment, multiple OS components, such as OSes, OS kernels, kernel modules, libraries, packages, and/or different versions of the OS components may be stored in a computing device. The OS components may include one or more binaries, files, and/or other data that may be read-only. In one embodiment, the OS components may be user space components, modules, libraries and/or packages (e.g., components, modules, libraries, etc., are not included as part of the kernel for an OS). For example, the OS component may be a library for a compiler, a user interface (e.g., a command line shell, a graphical user interface), a library for network communications, etc. A user may select one or more of the OS components to use when booting and operating the computing device. For example, a user may select a first version of an OS and may select a library for the OS. The computing device may create links to the selected OS components and may store the links in a boot location (e.g., a folder or a directory). The computing device may include multiple boot locations (e.g., multiple groups or sets of OS components in different folders or directories). Each boot location may be used by the computing device to boot and/or operate the computing device. For example, the computing device may boot a computing device using the OS components (e.g., a version of the OS, libraries, and/or packages) located in a boot location. The computing device may set one of the boot locations as the OS root (e.g., the location where the computing device will look for the OS to use when booting and operating the computing device). The computing device may also use different boot locations (e.g., different sets of OS components) to boot and/or operate the computing device. The computing device may use any type of file system (e.g., the UNIX file system) that supports links (e.g., hard links and/or symbolic links) to files and/or directories. A hard link may be a directory entry that associates a name with a file on a file system. A hard link may point to location where the file is stored. When a hard link is accessed, the file system may redirect the access to the location where the file is stored. A symbolic link may be a type of file that contains a reference (e.g., points) to another file or directory in the form of an absolute or relative path. When a symbolic link is accessed, the file system may redirect the access to the location where the file/directory is stored.

In one embodiment, the OS components may be stored in a central location within a storage device (e.g., on a partition in a hard disk) in the computing device. The boot locations may contain links (e.g., hard links or symbolic links) to the files, binaries and/or data for the OS components. This may allow the same OS component to be used by multiple boot locations, without duplicating the OS component (e.g., having another copy of the OS component) in the multiple boot locations. By using links in the boot locations, the computing device may be able to reduce the amount of storage space used by the different boot locations. In one embodiment, checksums of the files and/or data used in OS components may be used to determine whether the files and/or data are already located in the storage device. The computing device may compare the checksums of the files for OS components on a server (e.g., a build server) with checksums of files that are in the storage device. If there are matching checksums, the computing device may not download and/or obtain the files/data associated with the matching checksums from the server. If there are checksums for data/files on the server that do not match any checksums for data/files on the computing device, the computing device may obtain the data/files associated with the non-matching checksums from the server.

In one embodiment, because different OS components (e.g., different OSes, different packages, different libraries, different version of the packages and/or libraries, etc.) are stored on the computing device, a user may be able to create multiple boot locations and may customize each boot location with different OS components. This may allow a user (e.g., a software developer that is developing new OSes or new packages/libraries of OSes) to more easily test out new libraries, new packages, new versions of libraries/packages, and/or new versions of an OS. For example, a user (e.g., a software developer) may update a GNU C library that includes new functionality. The user may create a new boot location and may include a link to the updated library in the boot location. If the updated library does not work properly (e.g., the updated library has a bug that causes the computing device to function incorrectly or crash), the user may select another boot location to use when booting or operating the computing device (e.g., roll back to a stable version of the library in a previous boot location).

FIG. 1 is a block diagram illustrating an example directory structure 100, according to one embodiment. The directory structure 100 may be a directory structure for a file system on a computing device. The file system may be a system (e.g., software, hardware, or a combination of both) that organizes files and directories into a directory structure 100 on the computing device. Examples of file systems include, but are not limited to, the UNIX file system (UFS), the Z file system (ZFS), an extended file system such as ext3 or ext4, the journaling flash file system (JFFS), the new technology file system, (NTFS), the B-tree file system (BTRFS), etc. The directory structure 100 includes the following directories: a file system root directory (e.g., the "." directory), boot, home, os_components, os_v1, lib1_v1, package1_v1, os_v2, and package2_v1. The directories have a nested or tree-like structure. For example, directory os_v1 is located within directory os_components, directory lib1_v1 is located within directory os_v1, etc. The directory structure 100 also includes the following files: os_file_v1, file1_v1, file2_v1, os_file_v2, and file3_v1. The files are located within the directories of the directory structure 100. For example, os_file_v1 is located within directory os_v1, file file1_v1 is located within directory lib1_v1, etc.

It should be noted that the directories and files illustrated in directory structure 100 are merely examples. In some embodiments, the directory structure 100 may include different directory layouts (e.g., different tree-like structures) with fewer or more directories than illustrated in directory structure 100 (e.g., there may be 10, 100, or 1000 directories and there may be many different levels of nesting of the directories). In other embodiments, the directory structure 100 may also include any number of different files (e.g., 100, 1000, 10000 files, etc.), which may be located in any of the directories in the directory structure 100.

The file system of the computing device may include data, files, objects, and/or components for multiple OSes, or multiple version of an OS. Each operating system may use different operating system components, such as an OS, an OS kernel (e.g., a base OS kernel), a kernel module (e.g., a software module and/or data that may be used to extend or add functionality to a base OS kernel), a package/library (e.g., a software module and/or data that may be used to add functionality to the computing device and/or an OS), other data/files used by an OS (e.g., icons, graphical images, translations of messages, such as an error message, that may be displayed to a user), and/or an application. For example, an OS may include a device driver (e.g., a kernel module that provides an interface between a physical device and the OS). In another example, an OS may include a media viewing application that allows users to view or play certain types of files (e.g., a portable document format (PDF) reader, a media player application, etc.). In one embodiment, an OS component may include one or more binaries or binary files (e.g., a file that is not a text file, a file that has been compiled into an executable or a library file, etc.). In another embodiment, the OS components (e.g., the files and/or binaries) may be read-only (e.g., the files may not be modified, changed, and/or overwritten).

As shown in FIG. 1, the computing device includes two different versions of an OS, os_v1 and os_v2. The OS kernel, data, files, modules, libraries, packages, etc., for the first version of the OS are stored in the directory (e.g., the folder) os_v1 of the directory structure 100. The OS kernel, data, files, modules, libraries, packages, etc., for the second version of the OS are stored in the directory (e.g., the folder) os_v2 of the directory structure 100. The computing device may include two different versions of the OS for various reasons. For example, a user may be upgrading from one version of the OS to another. In another example, a user may be testing out the second version of the OS. In a further example, a user may wish to use features which are included in the second version of the OS but not the first version of the OS, and the user may not want to remove or delete the first version of the OS.

In one embodiment, the computing device may boot (e.g., may start up) using either one of the two different versions of the OS. The computing device may set the OS root (e.g., the directory or folder the computing device uses when accessing an OS, files for the OS, modules, libraries and/or packages and for performing kernel operations) for the computing device (e.g., using a "chroot" command or an equivalent function/operation) to the os_v1 folder or the os_v2 folder depending on which version of the OS is used to boot the computing device. For example, if a user chooses to boot the computing device using the version os_v1 of the OS, the computing device may set the OS root to the folder os_v1 (e.g., by using the "chroot" command). In another embodiment, the user may create a new directory or folder for a new version of the OS (e.g., os_v3, not shown in the figure) and may include different packages and/or libraries in new directory/folder. The user may boot the computing device using the new version of the OS by setting the OS root for the computing device to the new directory/folder (e.g., by using the "chroot" command).

In one embodiment, rather than creating two separate copies of the files, directories, and/or data used by the two different OSes, the computing device may use links (e.g., hard links and/or symbolic links) in order to access the files used by the different OSes. For example, each of the two versions of the OS (e.g., os_v1 and os_v2) includes different libraries and/or packages. The OS os_v1 includes the library lib1_v1, which is stored in the directory lib1_v1 of the directory structure 100 and the OS os_v2 includes the package package1_v1. The library lib1_v1 includes the file file1_v1 and the package package1_v1 includes the file file2_v1. Both os_v1 and os_v2 use lib1_v1 (which includes file file1_v1). Instead of creating two copies of the file file1_v1, the computing device may store the file file1_v1 in a single location (e.g., a shared storage location on a disk drive, a partition on a disk drive, etc.) and may create a link (e.g., a hard link represented by the dashed lines) to the file file1_v1 in the directory lib1_v1 for both OSes. In one embodiment, the computing device may receive the link from another computing device or component (e.g., a server computer may create the link and provide the link to the computing device). The OSes may access file1_v1 using the links (e.g., the hard links). In one embodiment, the computing device may also use symbolic links. For example, the computing device may create a symbolic link to a directory or folder where an OS component is stored.

In one embodiment, the computing device may be able to transition more easily between different versions of an operating system and/or the same OS with different versions of packages and/or libraries because the OS components (e.g., the binary files, the libraries, the packages, etc.) for the different versions of the OS are all located within the computing device. The user may select different combinations of OS components (e.g., different libraries, different packages) and/or different versions of the OS components (OS version, the library version, and/or the package version) and may create new folders for the selected combinations and/or versions of the OS components. The user may then boot the computing device using the selected combinations and/or version of the OS components (e.g., by setting the OS root to one of the new folders using a "chroot" command). This may allow a user to boot the computing device using different versions of an OS or using the same version of the OS with different libraries and/or packages. In another embodiment, because the different versions of the OSes, libraries, packages, etc., may often use the same files, using links (e.g., hard links) to those files (rather than storing separate copies of the files), this may allow the computing device to reduce the amount of storage space used by the multiple boot locations.

In one embodiment, the computing device may be able to use a different boot location (e.g., use a different OS or different OS components) when the computing device is unable to boot using the first boot location. For example, a user may create a second boot location that includes an updated version of certain OS components (e.g., an updated OS, an updated library). The OS components may not function properly (e.g., the OS components may have bugs) and may cause the computing device to crash when booting. The computing device may use a previously working boot location (e.g., roll back to a previous boot location) or any other boot location if the computing device determines that it was unable to boot using the currently selected boot location.

Figure 2:
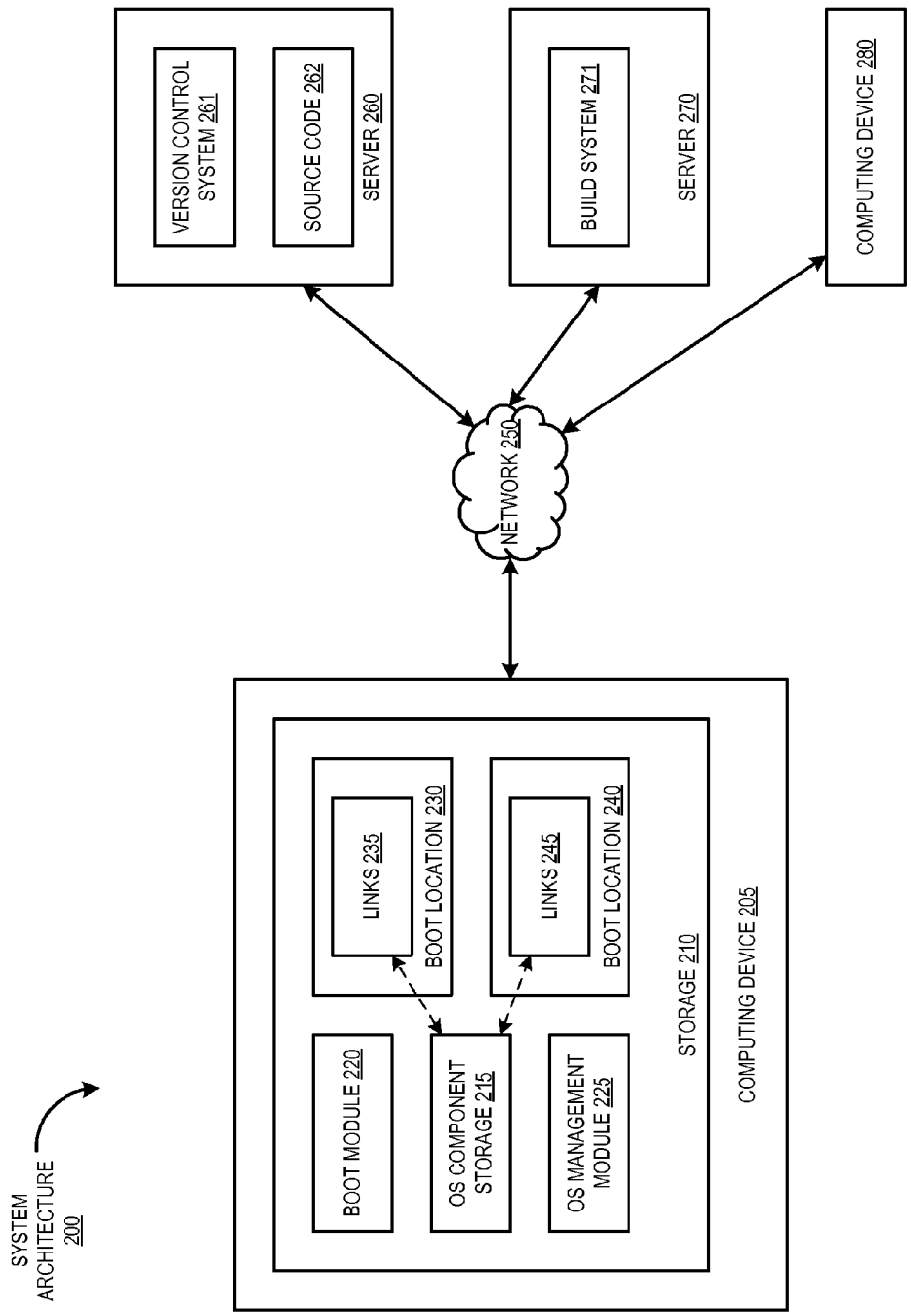
FIG. 2 is a block diagram illustrating a system architecture in which embodiments of the disclosure may operate.

FIG. 2 is a block diagram illustrating a system architecture 200 in which embodiments of the disclosure may operate. The system architecture 200 includes a computing device 205 that is communicatively coupled to a network 250. The computing device 205 may be a desktop computer, a laptop computer, a mainframe computer, a server computer, a personal digital assistant (PDA), smart phone, a netbook computer, a tablet computer, etc. Network 250 may be a public network (e.g., the Internet), a private network (e.g., a local area network (LAN) or wide area network (WAN)), a wired network (e.g., Ethernet network), a wireless network (e.g., an 802.11 network), a cellular network (e.g., a Long Term Evolution (LTE) network), a broadcast network, and/or a combination thereof. The system architecture 200 also includes servers 260, 270, and a computing device 280 which are also communicatively coupled to the network 250.

The computing device 205 includes a storage 210. The storage 210 may include one or more storage devices, such as hard disks, flash drives, flash memory, and/or any other type of device capable of storing data. The storage 210 includes OS component storage 215, boot module 220, OS management module 225, and boot locations 230 and 240. Boot location 230 includes links 235 and boot location 240 includes links 245.

In one embodiment, the boot module 220 may be used by the computing device 205 when the computing device boots or starts up. For example, the boot module 220 may initialize components or devices in the computing device 205 (e.g., CD-ROM drives, network interface cards, keyboard, mouse, disk drives, etc.). In another example, the boot module 220 may determine the OS that the computing device 205 should use when booting or starting up. For example, as discussed above in conjunction with FIG. 1, the boot module 220 may boot the computing device using the OS components for a first version of an OS (e.g., os_v1) or the OS components for a second version of the OS (e.g., os_v2). In another example, the boot module 220 may boot the computing device using the same version of an OS but with different packages or libraries. The boot module 220 may set the OS root directory or folder for the computing device based on user input. For example, the boot module 220 may set the OS root directory to a directory containing a second version of the OS (e.g., to directory os_v2 shown in FIG. 1). The boot module 220 may set the OS root directory based on data provided by the OS management module 225, as discussed further below.

In one embodiment, the OS component storage 215 may include files and/or other data (e.g., binaries) for different OSes or different versions of the OSes (e.g., different OS kernels), different packages, different libraries, different versions of packages, and/or different versions of libraries. The OS components stored in the OS component storage 215 may be read-only, such that the OS components may not be modified, updated, and/or overwritten. In one embodiment, new versions of OSes, new versions of packages, and new versions of libraries, etc., may be added to the OS component storage 215. One or more of the OS component storage 215 may be used by the computing device 205 to boot and/or operate the computing device 205. In one embodiment, the OS component storage 215 may be a directory/folder (or a tree of directories/folders) located in the storage 210. In another embodiment, the OS component storage 215 may be located within a single partition of the storage 210. For example, the OS component storage 215 (which stores all of the different OS components and different versions of the OS components) may be located within one partition on a hard disk or a flash disk drive in the computing device 205.

In one embodiment, the OS management module 225 may allow the computing device 205 to boot using one different OS components that are on the storage 201. For example, the OS management module 225 may allow the computing device to boot using a second, updated version of an OS while the first, older version of the OS remains on the storage 210 (e.g., remains installed on the computing device 205). In another example, OS management module may allow the computing device to boot using the same version of the OS, but with different packages and/or libraries.

The OS management module 225 may identify one or more components from the OS component storage 215 and may create links to the OS components. For example, the OS management module 225 may receive user input (via a graphical user interface (GUI)) indicating a selection of one or more OS components. In another embodiment, the OS management module 225 may receive the links from another device or component (e.g., receive the links from a server, such as server 270). A user may select a first version of an OS, and a library and a package. The OS management module 225 may create a directory, or folder (e.g., a boot location such as boot location 230 or 240) that includes links (e.g., links 235 or 245) to the selected OS components (e.g., files for the first version of the OS, the files for the library and the files for the package). For example, referring back go FIG. 1, the OS management module 225 may create the directory os_v1 (e.g., may create a boot location). The OS management module 225 may include library lib1_v1 and package package1_v1 in the directory os_v1. The OS management module 225 may also create links (e.g., hard links) for the files which are included in the OS os_v1, the library lib1_v1, and the package package1_v1 (e.g., files os_file_v1, file1_v1, and file2_v1). Referring back go FIG. 2, the storage 210 includes two boot locations 230 and 240.

In one embodiment, each of the boot locations 235 and 240 may be a directory or a folder that includes other directories/ folders and/or links to files, binaries, and/or other data for OS components (e.g., for an OS and the packages or libraries included with the OS). The OS management module 225 may set the OS root to one of the boot locations 230 and 240, based on user input. For example, the OS management module 225 may set the OS root for the computing device 205 to boot location 240. This may cause the computing device 205 to boot using the OS components (e.g., OS kernel, libraries, packages, files, binaries, etc.) that are included in the boot location 240. The computing device 205 may access the OS components using the links 245 included in the boot location 240. In one embodiment, the boot location (e.g., boot location 230 and 240) may include the OS (e.g., the OS components such as the OS kernel, libraries, packages, etc.) that the computing device 205 may use when booting and that may be used to operating the computing device 205.

In one embodiment, the OS management module 225 may receive user input (via a GUI) indicating which of the boot locations 230 and 240 to use when booting and operating the computing device 205 (e.g., which OS root and/or which OS to use). For example, the OS management module 225 may present a list of the different boot locations (e.g., a list of the different OSes) that the computing device 205 may use. The user may select one of the different boot locations (e.g., select one of the OSes). The OS management module 225 may communicate with the boot module 220 to indicate which boot location should be used when booting and/or operating the computing device 205. For example, OS management module 225 may send a message or other data to the boot module 220 indicating the selected boot location (e.g., boot location 240). In another example, the OS management module 225 may update a configuration file (or other data) used by the boot module to indicate the selected boot location (e.g., boot location 240). Although two boot locations (e.g., boot location 230 and 240) and two sets of links (e.g., links 235 and 245)) are illustrated in FIG. 2, it should be understood that the storage 210 may include any number of different boot locations and different sets of links. For example, the storage 210 may include fifteen boot locations, each boot location include different OS components and/or different versions of OS components.

In one embodiment, the server 260 may be a computing device that includes the source code 262 for the OS components that are stored in the OS component storage 215. For example, the source code 262 may include one or more source code files (e.g., C files, C++ files, JAVA files, etc.) that are used to compile or build a binary file, an OS kernel, a package, and/or a library. The server 260 also includes a version control system 261 that may be used to control access to the source code 262 (e.g., to the source code files). The version control system 261 may allow a user to check-out a source code file, modify a source code file, and/or check-in a source code file. The version control system 261 may also allow a user to create different versions of source code files, and to track the changes that are made to the source code files.

In one embodiment, the server 270 may be a computing device that builds one or more source code files into binary files (e.g., binaries). The server 270 includes a build system 271 (e.g., an application or software module) that may process one or more source code files to generate one or more binaries or files (e.g., that may build and/or compile source code). For example, the build system 271 may process (e.g., compile) multiple source code files into one or more binaries or files for a kernel of an OS. In another example, the build system 271 may process (e.g., compile) multiple source code files into a library file. The build system 271 may access the source code 262 from the server 260 when building or compiling binary files. The binary files may be included in one or more OS components. In one embodiment, the computing device 205 may receive OS components from the server 270 and may store the OS components in the OS component storage 215. In one embodiment, the computing device 205 may request one or more OS components from the server 270. For example, the computing device 205 may request a specific version of a library or a specific version of an OS kernel. The server 270 may access source code 262 on server 260 and may build or compile the binaries and/or other files for the OS components. The server 270 may then provide the OS components to the computing device 205.

Although the version control system 261, the source code 262, and the build system 271 are located on different servers, in some embodiments, one or more of the version control system 261, the source code 262, and the build system 271 may be located in the computing device 205. For example, the one or more of the version control system 261 and the build system 271 may be located on the computing device 205. In another example, the source code 262 may be located within the storage 210 on the computing device 205.

In one embodiment, the computing device 205 may use checksums of the data and/or files in the OS component storage 215 to help reduce the amount of space (e.g., storage spaced) used by the OS component storage. The computing device 205 may compute checksums for the files and/or data files for the OS components. For example, the computing device may compute a checksum for each file in a library or package. The checksum may include the metadata for the file, such as the time the file was created, the time that the file was last modified, the owner of the file, a unique identifier (UID) for the file, a globally unique identifier (GUID) for the file, and/or extended file attributes (e.g., data that is not interpreted and/or used by the file system, but is associated with the file). In one embodiment, the checksum may be hash that is obtained and/or generated by applying or using a hashing algorithm, function, and/or operation on the file or data (including metadata for the file or data, such as the owner, extended attributes, etc.). Examples of hashing algorithms/functions/operations may include, but are not limited to, the secure hash algorithms (SHA), such as SHA-1, SHA-2, SHA-3), the message digest algorithms (e.g., MD-2 through MD-6), a hash-based message authentication code (HMAC), a cyclic redundancy check (CRC), cryptographic hashing algorithms, and/or non-cryptographic hashing algorithms.

In one embodiment, the OS management module 225 may request a list of checksums from the server 270. For example, the OS management module 225 may request a first list of checksums (e.g., a list of hashes) for all files and/or data that the server 270 has for one or more OS components. The server 270 may provide the OS management module 225 with the first list of checksums. The OS management module 225 may generate and/or obtain a second list of checksums for all the files and/or data that are stored in the OS component storage 215 (e.g., checksums for the files for a package, a library, etc.). The OS management module 225 may compare the checksums on the first list from the server 270, with checksums in the second list. If a checksum on the list matches a checksum on the second list, the OS management module 225 may not request the data/file (associated with the checksum) from the server 270 because the data/file is already stored in the OS component storage 215 (e.g., because the computing device 205 already has that data/file). For example, a matching checksum may indicate that the computing device 205 already has a file that is identical to the file on the server 270. If there is a checksum on the first list that is not in the second list, the OS management module may request the file/data associated with that checksum, and may store the file/data in the OS component storage 215. In one embodiment, by checking the checksums for the data/files, the OS management module 225 may be able to prevent duplicate copies of files/data from being stored in the OS component storage 215 and may reduce the amount of storage space used by the OS component storage 215.

The computing device 280 may be a client computer that may access and/or communicate with the computing device 205. In one embodiment, the computing device 280 may communicate with the OS management module 225 on the computing device 205. For example, the computing device 280 may open a network port (e.g., a communication port, such as a transmission control protocol (TCP) port) with the computing device 205 and may communicate data with the computing device 205. In one embodiment, the computing device 280 may be used to select a boot location for the computing device 205 to use when booting. For example, a user may connect to the computing device 205 using the computing device 280, and may instruct the computing device 205 to use a particular boot location. This may allow a user to remotely control the boot location used by the computing device 205.

Figure 3:
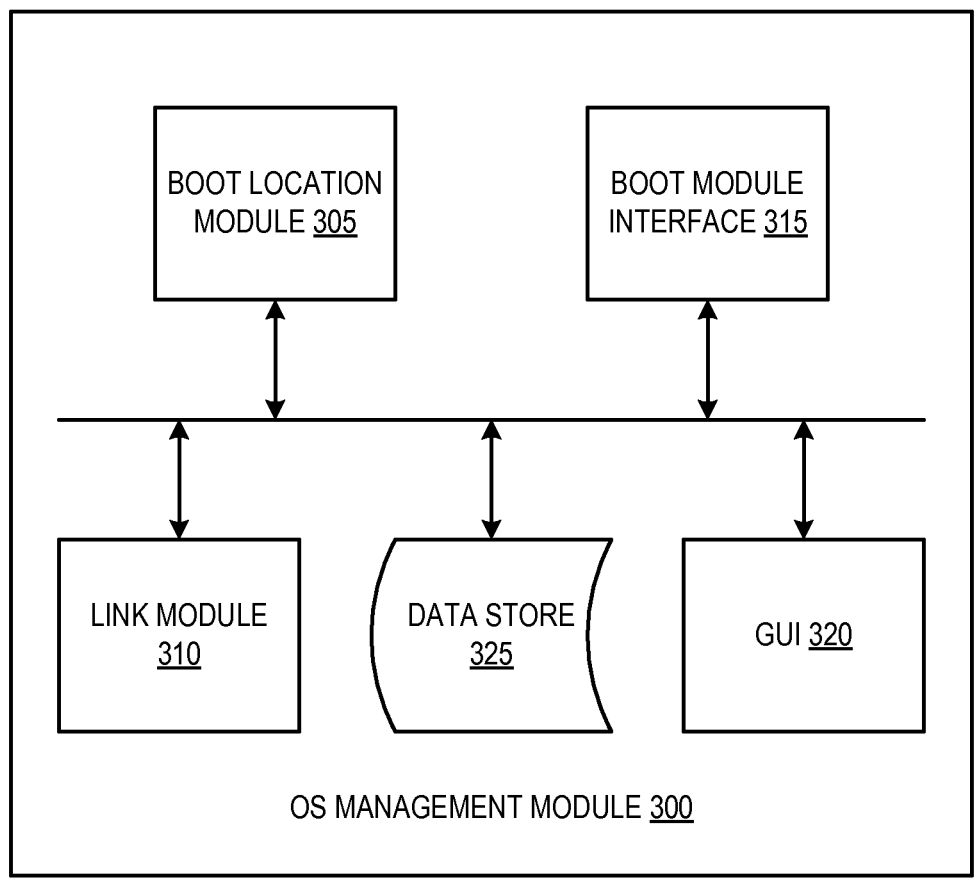
FIG. 3 is a block diagram illustrating an operating system (OS) management module, according to one embodiment.

FIG. 3 is a block diagram illustrating an operating system (OS) management module 300, according to one embodiment. The OS management module 300 includes a boot location module 305, a link module 310, a boot interface module 315, a graphical user interface (GUI) 320, and a data store 325. More or less components may be included in the OS management module 300 without loss of generality. For example, two of the modules may be combined into a single module, or one of the modules may be divided into two or more modules. In one embodiment, one or more of the modules may reside on different computing devices (e.g., different desktop or laptop computers).

In one embodiment, the boot location module 305 may create one or more boot locations (e.g., one or more directories, such as os_v1 as illustrated in FIG. 1) based on user input. For example, a user may provide user input to the OS management module 300 indicating different OS components and/or different versions of OS components that should be included in a boot location. The boot location module 305 may create a boot location (e.g., a directory) and may create other directories for the various libraries, packages, etc., that may be included in the boot location. For example, the boot location module 305 may create the directories os_v1 and os_v2 (e.g., boot locations) illustrated in the directory structure 100 of FIG. 1. In one embodiment, the boot location module 305 may also add, remove, and/or replace one or more OS components in a boot location. For example, the boot location module 305 may remove the directory for a package in the boot location (and any links or other directories in the directory). The boot location module 305 may add a new directory for a newer version of the package in the boot location.

In one embodiment, the boot location module 305 may use the link module 310 to create links to the files, binaries, and/or other data used by in a boot location. For example, referring back to FIG. 1, in the directory os_v1 (e.g., the boot location), the boot location module 305 may use link module 310 to create a link (e.g., a hard link) to the file os_file_v1. As discussed above, the files and/or data (e.g., the binaries) for the OS components and the different version of the OS components may be stored in a common location in a computing device. For example, all of the OS components may be stored in a directory (e.g., the directory os_components as illustrated in FIG. 1) or may be stored in a common location on a storage device (e.g., OS component storage 215 as illustrated in FIG. 2). The link module 310 may create links (e.g., hard links to files or symbolic links to directories) to the files and/or directories of OS components stored in the common location. The boot location module 305 may include the links created by the link module 310, in the boot location. In one embodiment, the link module 310 may obtain and/or receive the links from another computing device. For example, the link module 310 may obtain the links from the server 270 and/or the server 260.

In one embodiment, the boot interface module 315 may communicate with the boot module (e.g., a boot system or a boot loader for the computing device). The boot module of the computing system may be software, hardware, and/or a combination of both. The boot module may initialize devices or components used by the computing system and may be used to initiate the operation of the OS for the computing device (e.g., may be used to boot or startup the computing device). The boot interface module 315 may instruct (e.g., send a message, modify a configuration file) the boot module to use one of multiple boot locations, based on user input received by the OS management module 300. For example, referring back to FIG. 1, the OS management module 300 may receive user input indicating that the user wants to use a first version of an operating system (e.g., os_v1). The boot module interface 315 may update a configuration script or may instruct the boot module to use the OS components in the os_v1 folder when booting the computing device (e.g., to use the OS, packages, and/or libraries in the os_v1 folder). For example, the boot module interface 315 may change the OS root for the computing device (e.g., the directory where the computing device looks for the OS), by executing a "chroot" command (e.g., a change root command) or some other equivalent command, function and/or operation.

In one embodiment, changing the OS root for the computing device may be an atomic operation. An atomic operation may be an operation that does not have an intermediate state (e.g., an operation that may not be partially performed). For example, if an atomic operation does not complete, then any parts of the operation that may have been performed may be rolled back or undone. In one embodiment, because all of the OS components already reside on the computing device (e.g., all of the data/files for the different OSes, different versions of the OSes, different libraries/packages, different version of the libraries/packages are stored on the computing device), the computing device may be able to atomically switch between using different OS components (e.g., by using the chroot operation). For example, when updating a typical OS, the computing device may often install or replace new files during the update. If the computing device unexpectedly powers down while updating the OS, the update may not complete and may cause the computing device to function improperly (e.g., because not all of the files were updated). However, because the setting a new boot location (e.g., using a chroot operation to set an OS root to the new boot location) may be an atomic operation, even if the chroot operation does not complete, the computing device can still boot using the boot location that was previously used because all of the OS components in the previous boot location are still on the computing device and have not been changed or modified.

In one embodiment, the GUI 320 may provide a user interface (e.g., text, images, video, multi-media, buttons, text fields, radio buttons, drop down menus, file menus, a list box, a check box, a window, other user interface elements, widgets, and/or controls, etc.) to present data to a user and to receive user input. The GUI 320 may allow a user to provide user input to indicate which OS components should be included in a boot location. For example, the GUI 320 may display a list of all OS components that are located in the computing device (e.g., all OS components located in OS component storage 215 illustrated in FIG. 2). The GUI 320 may allow a user to select one or more of the OS components (e.g., to check a check box, or select an item from a drop down menu) to be included in the boot location. In another embodiment, the GUI 320 may allow a user to select a boot location that is to be used the next time the computing device is restarted or rebooted. For example, a computing device may have three boot locations. The GUI 320 may display a list of the three boot locations and may receive user input indicating the third boot location. The OS management module 300 may instruct a boot module (e.g., a boot loader) to boot the computing device using the third boot location the next time the computing device is reset or rebooted.

In one embodiment, the data store 325 may store a list of OS components that are located in the common storage location (e.g., OS component storage 215 illustrated in FIG. 2, a folder in a partition on a disk drive, etc.). For example, the data store 325 may include a list of all OS versions, OS kernels, packages, libraries, etc., that are located in the common storage location. In another embodiment, the data store 325 may store a list of the OS components that are included in a boot location. For example, the data store may include a list of the different packages, libraries, and versions of the packages/libraries that are included in a boot location. The data store 320 may be a memory (e.g., random access memory), a cache, a drive (e.g., a hard drive), a flash drive, or another type of component or device capable of storing data.

Figure 4:
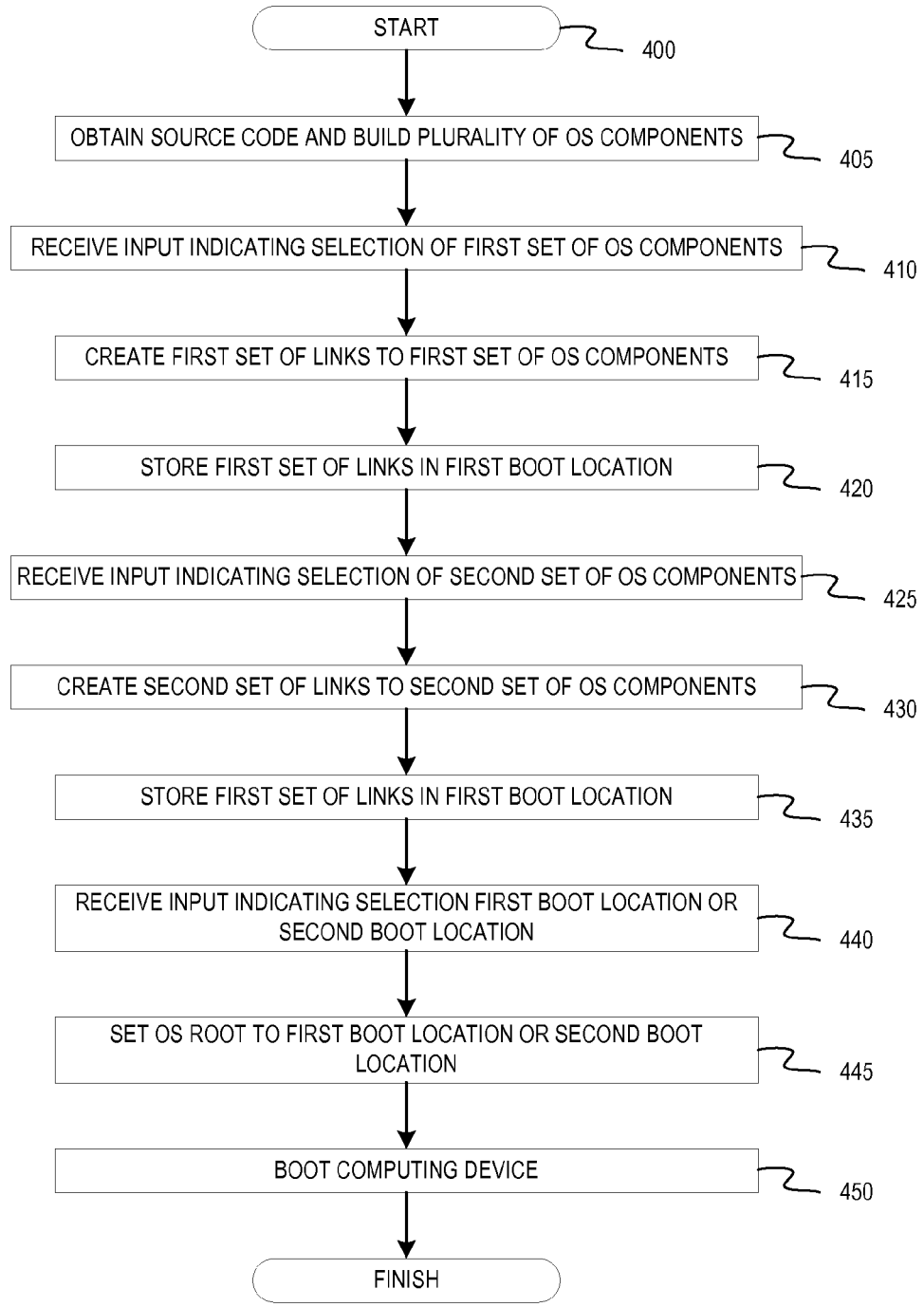
FIG. 4 is a flow diagram illustrating a method of booting a computing device, according to another embodiment, according to one embodiment.
Figure 5:
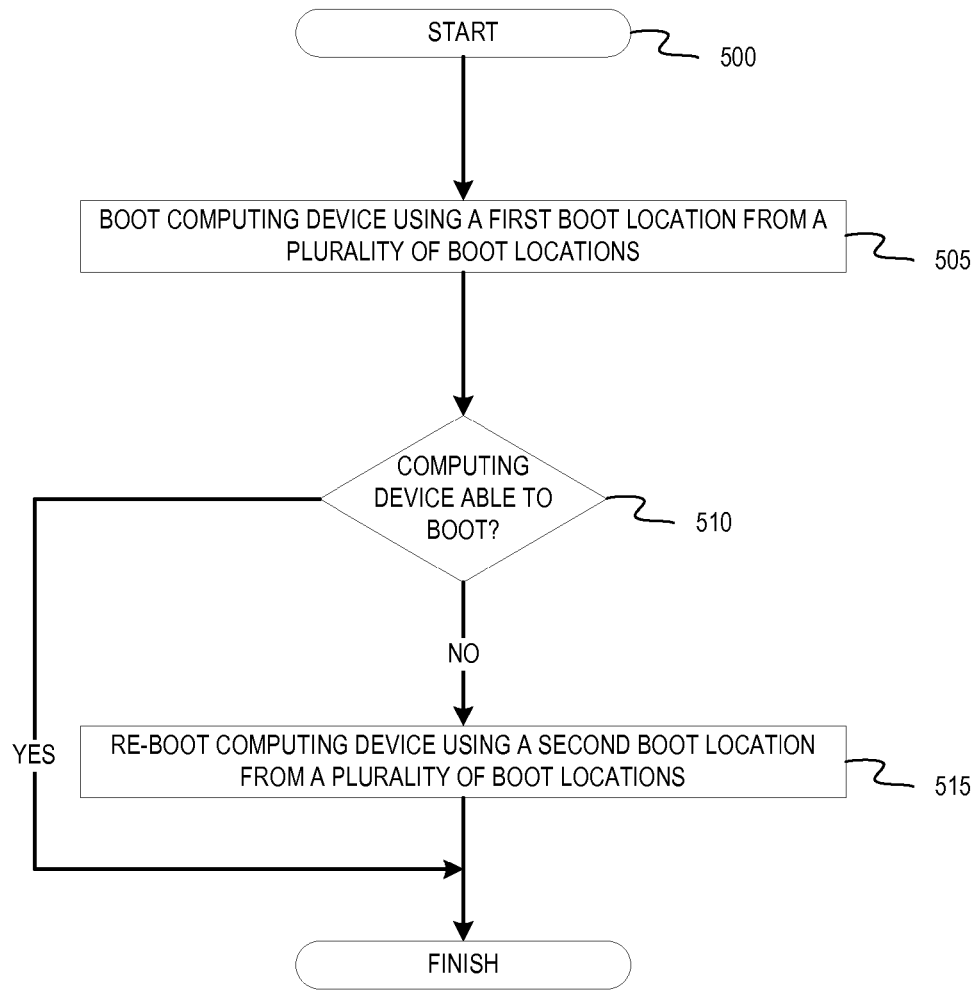
FIG. 5 is a flow diagram illustrating a method of booting a computing device, according to another embodiment.

FIGS. 4-5 are flow diagrams illustrating methods for booting a computing device. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 4 is a flow diagram illustrating a method of booting a computing device, according to one embodiment. The method 400 may be performed by processing logic that comprises hardware (e.g., circuitry, dedicated logic, programmable logic, microcode, etc.), software (e.g., instructions run on a processor to perform hardware simulation), or a combination thereof. In one embodiment, method 400 may be performed by an OS management module, as shown in FIGS. 2 and 3.

Referring to FIG. 4, the method 400 begins at block 405 where the method 400 obtains source code for a plurality of OS components and compiles the source code (e.g., compiles source code into binaries, files, and/or other data for the OS components) to build the plurality of OS components. In one embodiment, the OS components may be stored in a location on a storage device (e.g., a partition on a disk drive or flash drive) after the OS components are built or compiled. In another embodiment, block 405 may be optional (e.g., the method 400 may not obtain source code and build the OS components, but may receive the OS components from another computing device, such as a server). At block 410, the method 400 receives user input indicating a selection of a first set of OS components. For example, the user input may indicate a selection of a first version of an OS, and one or more packages/libraries. The method 400 creates a first set of links (e.g., hard links and/or symbolic links) to the first set of OS components (block 415). At block 420, the method 400 stores the first set of links in a first boot location (e.g., in a directory).

At block 425, the method receives additional user input indicating a selection of a second set of OS components. For example, the user input may indicate a selection of a second version of an OS, and one or more packages/libraries. In another example, the user input may indicate a selection of the same version of the OS but different packages/libraries. The method 400 creates a second set of links (e.g., hard links and/or symbolic links) to the second set of OS components (block 430). At block 435, the method 400 stores the first set of links in a second boot location (e.g., in a second directory).

At block 440, the method 400 receives user input indicating a selection of the first boot location or the second location. For example, a user may want to use a first version of the OS with certain packages/libraries, and may select the first boot location which includes links to the first version of the OS and the packages/libraries. At block 445, the method 400 sets the OS root (e.g., the directory and/or location where the computing device will look for the OS to use when booting and operating the computing device) to the first boot location or the second boot location, based on the user input. For example, if the user input indicated a selection of the second boot location, the method 400 sets the OS root to the second boot location. In one embodiment, the method 400 may use a "chroot" command or an equivalent function/operation to set the OS root to the second boot location. The method 400 boots the computing device using the selected boot location at block 450. After block 450, the method 400 ends.

FIG. 5 is a flow diagram illustrating a method of booting a computing device, according to another embodiment. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 may be performed by an OS management module, as shown in FIGS. 2 and 3. In another embodiment, the method 500 may be performed after the method 400 of FIG. 4. For example, the method 500 may be performed after block 450 of the method 400.

Referring to FIG. 5, the method 500 begins at block 505 where the method 500 boots a computing device (e.g., a desktop computer, a laptop computer, etc.) using a first boot location from a plurality of boot locations. For example, referring back to FIG. 1, the method 500 may boot the computing device using the directory os_v1 (e.g., a first boot location). At block 510, the method 500 may determine whether the computing device is able to boot using the first boot location. For example, the first boot location may include a library/package that has an error (e.g., a bug or a regression) that may cause a computing device to crash when the computing device uses the library/package. If the computing device is able to start or boot using the first boot location, the method 500 ends. If the computing device is unable to boot using a boot location (e.g., one or more OS components in the first boot location causes the computing devices to crash), the method 500 reboots or restarts the computing device using a second boot location from the plurality of boot locations. For example, referring back to FIG. 1, the method 500 may reboot the computing device using the directory os_v2 (e.g., a second boot location). After rebooting the computing device using the second boot location, the method 500 ends.

Figure 6:
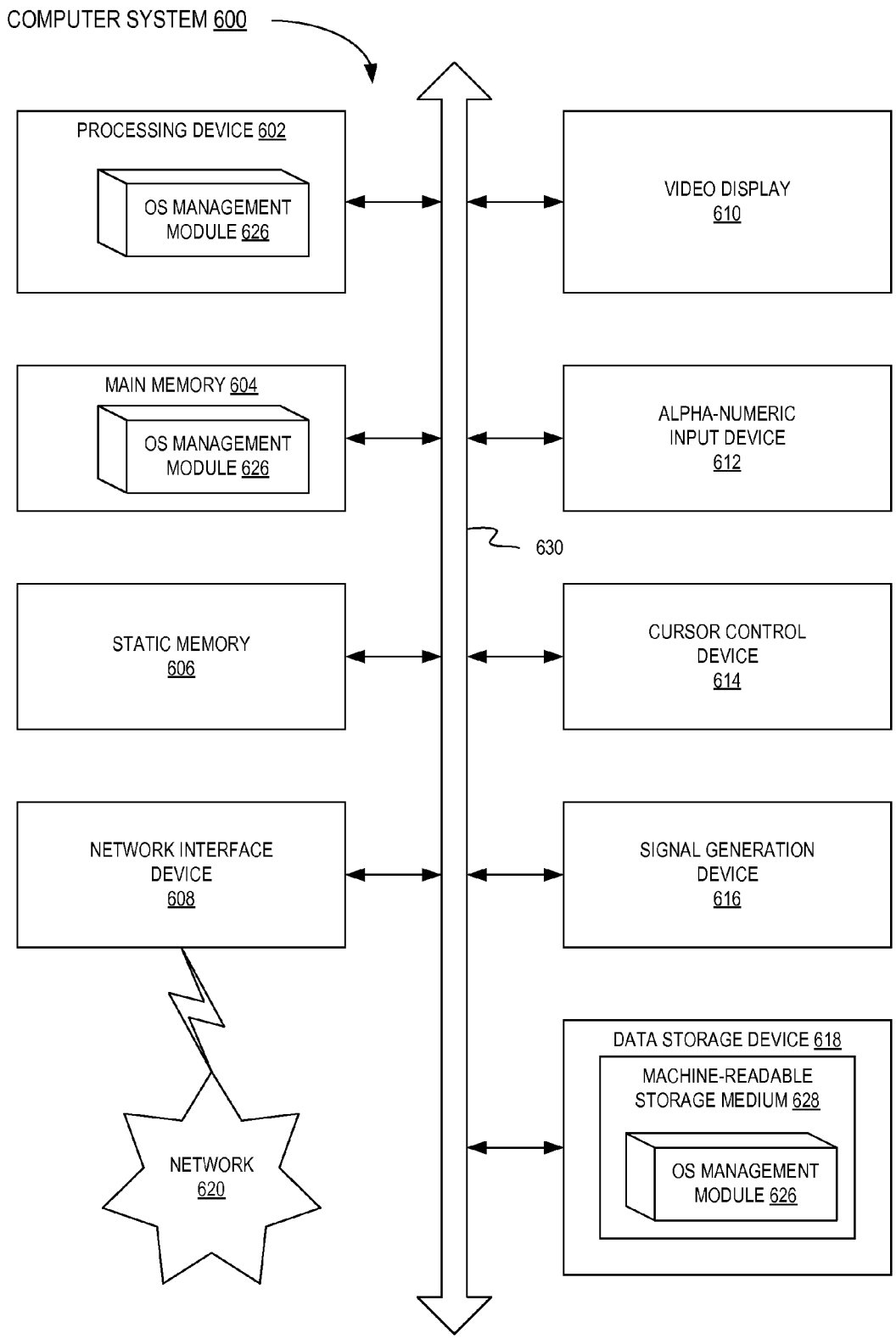
FIG. 6 is a block diagram of a machine in the example form of a computer system, in accordance with one embodiment.

FIG. 6 illustrates a diagrammatic representation of a machine in the example form of a computer system 600 within which a set of instructions, for causing the machine to perform any one or more of the methodologies discussed herein, may be executed. The system 600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (e.g., a processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute OS management module 626 for performing the operations and steps discussed herein.

The computer system 600 may further include a network interface device 608 which may communicate with a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and a signal generation device 616 (e.g., a speaker). In one embodiment, the video display unit 610, the alphanumeric input device 612, and the cursor control device 614 may be combined into a single component or device (e.g., an LCD touch screen).

The data storage device 618 may include a computer-readable medium 628 on which is stored one or more sets of instructions (e.g., instructions of OS management module 626) embodying any one or more of the methodologies or functions described herein. The OS management module 626 may also reside, completely or at least partially, within the main memory 604 and/or within the processing device 602 during execution thereof by the computer system 600, the main memory 604 and the processing device 602 also constituting computer-readable media. The instructions may further be transmitted or received over a network 620 via the network interface device 608.

While the computer-readable storage medium 628 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "storing," "receiving," "creating," "obtaining," "booting," "setting," "performing," "obtaining," "compiling," "determining," "rebooting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    storing a plurality of operating system components in a storage location in a computing device;
    receiving a selection of a first set of operating system components from the plurality of operating system components;
    obtaining a first set of links to the first set of operating system components;
    storing the first set of links in a first boot location;
    receiving a selection of a second set of operating system components from the plurality of operating system components;
    obtaining a second set of links to the second set of operating system components;
    storing the second set of links in a second boot location;
    storing the first set of links in the second boot location upon receiving a selection to add the first set of operating system components to the second boot location;
    receiving a user input indicating a selection of one of the first boot location or the second boot location; and
    booting, by a processing device, the computing device using the first boot location or the second boot location, in view of the user input, wherein the booting comprises accessing the first set of operating system components using the first set of links.

2. The method of claim 1, wherein booting the computing device using the first boot location or the second boot location comprises:
    setting an operating system root for the computing device to the first boot location or the second boot location.

3. The method of claim 2, wherein setting the operating system root comprises:
    performing a chroot operation.

4. The method of claim 1, further comprising:
    obtaining source code for the plurality of operating system components; and
    compiling the source code to generate the plurality of operating system components.

5. The method of claim 1, wherein the first set of links and the second set of links comprises one or more of a symbolic link or a hard link.

6. The method of claim 1, wherein the plurality of operating system components is stored in a single partition located in the storage location.

7. The method of claim 1, further comprising:
    receiving additional operating system components;
    receiving a selection of a third set of operating system components from one or more of the plurality of operating system components and the additional operating system components;
    obtaining a third set of links to the third set of operating system components;
    storing the third set of links in a third boot location; and
    booting the computing device using the third boot location.

8. The method of claim 1, further comprising:
    when booting the computing device using the second boot location:
        determining that the computing device is unable to boot using the second boot location; and
        rebooting the computing device using the first boot location.

9. The method of claim 1, wherein each operating system component in the plurality of operating system components comprises one or more of an operating system, an operating system kernel, a package, or a library.

10. The method of claim 2, wherein setting the operating system root comprises an atomic operation.

11. A system comprising:
    a memory to store a plurality of operating system components; and
    a processing device, operatively coupled to the memory, to:
        receive a selection of a first set of operating system components from the plurality of operating system components;
        obtain a first set of links to the first set of operating system components;
        store the first set of links in a first boot location;
        receive a selection of a second set of operating system components from the plurality of operating system components;
        obtain a second set of links to the second set of operating system components;
        store the second set of links in a second boot location;

store the first set of links in the second boot location upon receipt of a selection to add the first set of operating system components to the second boot location;

receive a user input indicating a selection of one of the first boot location or the second boot location; and boot the system using the first boot location or the second boot location, in view of the user input, wherein to boot the system comprises to access the first set of operating system components using the first set of links.

12. The system of claim 11, wherein the processing device is further to:

set an operating system root for the system to the first boot location or the second boot location, using a chroot operation.

13. The system of claim 11, wherein the processing device is further to:

obtain source code for the plurality of operating system components; and compile the source code to generate the plurality of operating system components.

14. The system of claim 11, wherein the plurality of operating system components is stored in a single partition located in the system.

15. The system of claim 11, wherein the processing device is further to:

when the system is booted using the second boot location:
determine that the system is unable to boot using the second boot location; and
reboot the system using the first boot location.

16. A non-transitory computer readable storage medium comprising instructions that, when executed by a processing device, cause the processing device to:

store a plurality of operating system components in a storage location in a computing device;

receive a selection of a first set of operating system components from the plurality of operating system components;

obtain a first set of links to the first set of operating system components;

store the first set of links in a first boot location;

receive a selection of a second set of operating system components from the plurality of operating system components;

obtain a second set of links to the second set of operating system components;

store the second set of links in a second boot location;

store the first set of links in the second boot location upon receipt of a selection to add the first set of operating system components to the second boot location;

receive a user input indicating a selection of one of the first boot location or the second boot location; and boot the computing device using the first boot location or the second boot location, in view of the user input, wherein to boot the system comprises to access the first set of operating system components using the first set of links.

17. The non-transitory computer readable storage medium of claim 16, wherein to boot the computing device further comprises:

to set an operating system root for the computing device to the first boot location or the second boot location using a chroot operation.

18. The non-transitory computer readable storage medium of claim 16, including further instructions that, when executed by the processing device, cause the processing device to:

obtain source code for the plurality of operating system components; and compile the source code to generate the plurality of operating system components.

19. The non-transitory computer readable storage medium of claim 16, wherein the plurality of operating system components is stored in a single partition located in the computing device.

20. The non-transitory computer readable storage medium of claim 16, including further instructions that, when executed by the processing device, cause the processing device to:

when the computing device is booted using the second boot location:
determine that the computing device is unable to boot using the second boot location; and
reboot the computing device using the first boot location.

* * * * *